No. 849,218. PATENTED APR. 2, 1907.
E. E. R. DRESCHER.
NECKTIE FASTENER.
APPLICATION FILED DEC. 1, 1906.

2 SHEETS—SHEET 1.

Witnesses
G. R. Thomas
Harry E. Chandler

Inventor
Esther E. R. Drescher
By 
Attorneys

No. 849,218. PATENTED APR. 2, 1907.
E. E. R. DRESCHER.
NECKTIE FASTENER.
APPLICATION FILED DEC. 1, 1906.
2 SHEETS—SHEET 2.
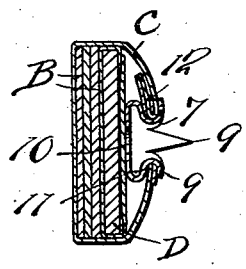
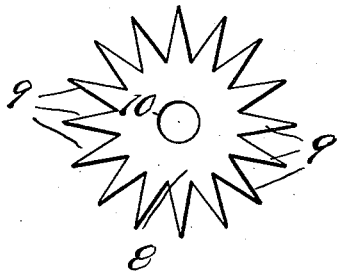
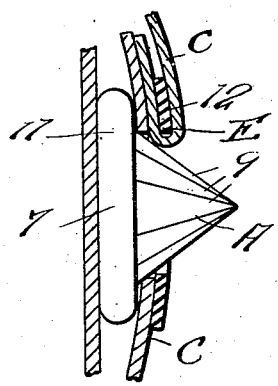
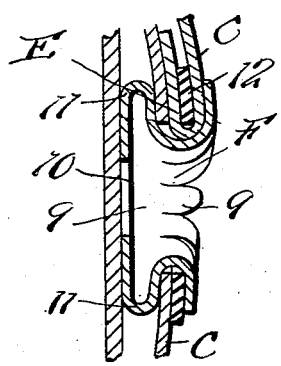
Inventor
Esther E. R. Drescher

UNITED STATES PATENT OFFICE.

ESTHER E. R. DRESCHER, OF PRINCETON, MINNESOTA.

NECKTIE-FASTENER.

No. 849,218.      Specification of Letters Patent.      Patented April 2, 1907.

Application filed December 1, 1906. Serial No. 345,957.

*To all whom it may concern:*

Be it known that I, ESTHER E. R. DRESCHER, a citizen of the United States, residing at Princeton, in the county of Millelacs, State of Minnesota, have invented certain new and useful Improvements in Necktie-Fasteners; and I do hereby declare the following to be a full, clear, and exact description of the invention, such as will enable others skilled in the art to which it appertains to make and use the same.

This invention relates to fasteners, and more particularly to fasteners for neckties, and has for its object to provide a fastener including a collar-button of ordinary use and a resilient socket which may be used to hold a necktie securely in position.

Another object is to provide a fastener the socket of which may be easily and securely fastened to the tie.

Other objects and advantages will be apparent from the following description, and it is to be understood that I do not desire to be limited to the exact details of construction shown and described, for obvious modifications within the scope of the appended claims will occur to a person skilled in the art.

Figure 1:
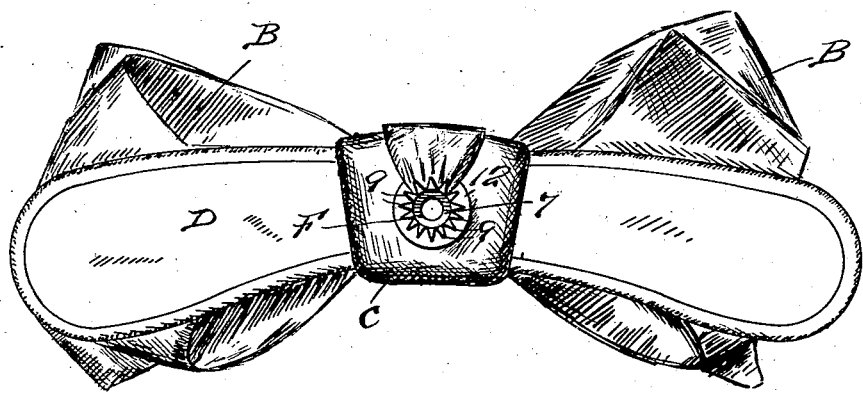
Figure 2:
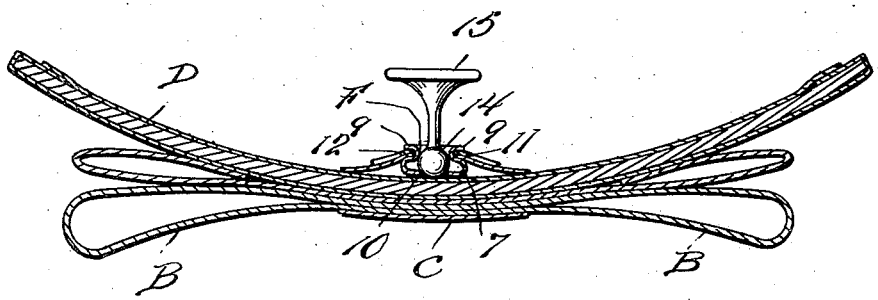
Figure 2:

In the drawings forming a portion of this specification, and in which like numerals of reference indicate similar parts in the several views, Figure 1 is a view of the rearward side of the tie to which the present invention is attached. Fig. 2 is a sectional view of the tie with the collar-button engaged in the socket. Fig. 3 is a view showing the tie and socket in section and illustrating the manner of attaching the socket, several of the fingers being bent into their final positions, while others are in their initial positions. Fig. 4 is a plan view of the blank from which the body portion of the socket is formed. Fig. 5 is an enlarged elevational view of the complete socket engaged through a thickness of cloth (shown in section) with the fingers in their initial positions previous to bending. Fig. 6 is an enlarged sectional view of the completed socket engaged in a thickness of cloth, the cloth being likewise shown in section.

Referring now to the drawings, the present invention includes a socket comprising a body portion 7, formed from a blank 8. This blank consists of a circular inner portion having at its periphery a plurality of radial tapered fingers 9 and having also a central opening 10. In forming the body portion the outer edge portions of the circular central portion of the blank are crimped inwardly, as shown at 11, and the tapered fingers 9 are bent to extend upwardly away from this central portion to bring their points into mutual engagement, when they form a cone A.

In the drawings there is shown a tie including bow portions B, which are confined by a central band C, the ends of this band lying at the rearward side of the tie, and the band also confines wings D, adapted for engagement beneath the collar of a wearer.

In attaching the socket the cone A is forced through one end portion of the band C, with the points of the fingers 9 extending outwardly, and a ring 12 is then disposed upon the cone. The other end portion of the band C is then engaged inwardly through the ring, as shown at E, after which the fingers 9 are separated and bent over the ring 12 to hold the parts in position. These fingers then surround an opening F for the reception of the cylindrical head 14 of a collar-button 15, and the method of fastening the tie in place will thus be easily understood.

It will be seen that the bending of the fingers 9 not only completes the socket and fastens it in position, but at the same time secures the confining-band C without the need of sewing.

It will be understood that the present fastener may be embodied in ties of different types, the cone A being passed through the cloth of the tie in each instance, with subsequent operation as just described.

It will be seen that the formation of the body portion provides a base portion extending outwardly beyond the base of the cone A.

The central opening 10, as will be observed, is provided to receive the head 14 of the collar-button 15, so that the tie may be positioned closely against the collar.

What is claimed is—

The combination with a tie including separate portions, of a confining-band engaged therearound, a socket including portions engaged through the band adjacent to one of its ends and including also a part within which the other end of the band is engaged, said first-named portions of the socket being bent to prevent disengagement thereof from the first-named end of the band and to prevent disengagement of the second-named end of the band from the part in which it is engaged.

In testimony whereof I affix my signature in presence of two witnesses.

ESTHER E. R. DRESCHER.

Witnesses:
DAN C. MIRICK,
LIMA DRAPGAN.